United States Patent [19]

Jackson

[11] Patent Number: 4,951,196
[45] Date of Patent: Aug. 21, 1990

[54] METHOD AND APPARATUS FOR ELECTRONIC DATA INTERCHANGE

[75] Inventor: Angela G. Jackson, Lincoln Park, Mich.

[73] Assignee: Supply Tech, Inc., Southfield, Mich.

[21] Appl. No.: 190,147

[22] Filed: May 4, 1988

[51] Int. Cl.$^5$ .................... G06F 15/21; G06F 15/24
[52] U.S. Cl. .................................................. 364/401
[58] Field of Search ........................................ 364/401

[56] References Cited

PUBLICATIONS

"ST1 User Manual", dated Jul. 20, 1988 by Supply Tech, Inc. (108 pages).

EDI News, Mar. 1988, p. 9.
EDI Trade Show brochure, pp. 12–15, date unknown.

Primary Examiner—Clark A. Jablon
Attorney, Agent, or Firm—Harness, Dickey & Pierce

[57] ABSTRACT

A programmable machine system and method for performing electronic data interchange among a variety of trading partners. The machine is programmed so that it can define, enter and translate business transaction data in a variety of different dictionary-structured formats thereby providing the user with the flexibility to work with electronic data in various formats without requiring reprogramming of the machine.

48 Claims, 26 Drawing Sheets

Only the direct and basic relationships and functionality are shown. Specifically, alternate module calling sequences are not shown; additional module functions are not shown; utility modules (such as view and print) are not shown; indirect updates (such as overlay element update affecting the mapping) are not shown; and initial updates (such as overlay selection initializing default values for all overlay data) are not shown.

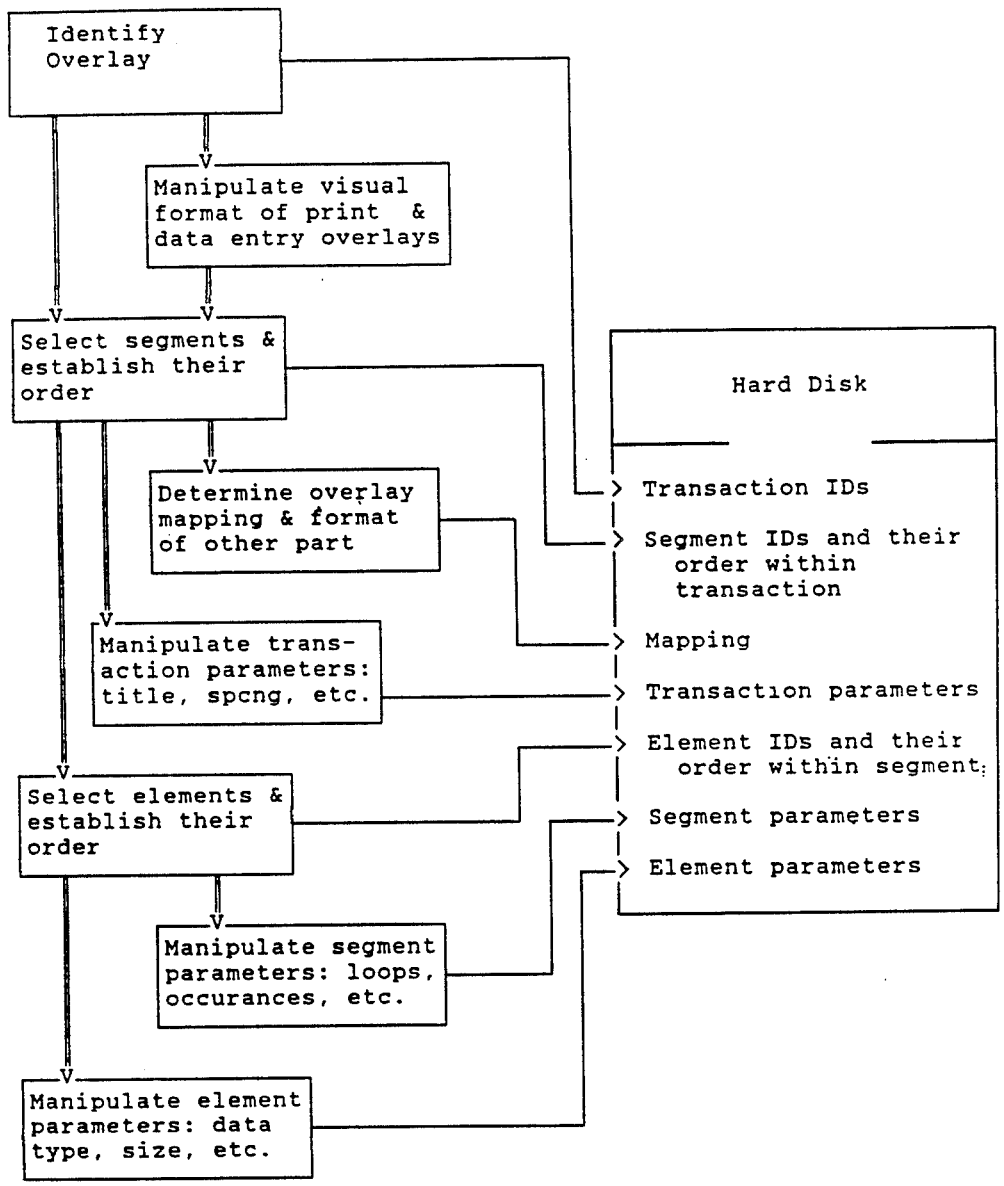

Only the direct and basic relationships and functionality are shown. Specifically, alternate module calling sequences are not shown; additional module functions are not shown; utility modules (such as view and print) are not shown; indirect updates (such as overlay element update affecting the mapping) are not shown; and initial updates (such as overlay selection initializing default values for all overlay data) are not shown.

FIGURE 2

```
***********************
Data-Entry-Process-Main.
***********************
     Perform Entry-Loop
          until all transactions have been entered.
     Position to first transaction in list to format.
     Perform Format-Loop
          until end of entered transactions list.
     Stop Run.

****************************************************
Entry-Loop.
****************************************************
     If transaction requires a different overlay
          Load Dictionary structured transaction overlay
          Load screen  images which were created during the build
               process for the current overlay
          Initialize intermediate work file
          Display screen image loaded from screen image file part
               of overlay
     .
     Reference    first     element    in    dictionary    structured
          transaction.
     Perform Field-Entry-Process
          until end of transaction.
     Add transaction to list of transactions to format.

Field-Entry-Process.
     If currently displayed screen is not the screen indicated by
          the current element
               Display the  screen image  indicated by  the current
          element
     .
     Use the element row/column calculated during the build
          process to position to the proper field on the screen.
     Check the  intermediate work  file for  data value
          corresponding to the current element.
     If the value exists on the intermediate work file
          Move the intermediate value to the input value area
     Else
     If there is a default value defined in the overlay  for this
          element
          Move the default value to the input value area
     Else
          Move spaces to the input value area
     .
     Set error condition to true.
     Perform Accept-Loop
          until error condition is false.
     Write Input value to Intermediate work file.
     Reference next element in dictionary structured transaction.
```

FIGURE 4(A)

```
Accept-Loop.
    Accept the input value from the console at the designated
        cursor position If the input value is blank
        If the element is mandatory
            Display an error message
            Go to end of accept loop Edit the input value according to data type and reserved
        words specified in the element definition in the
        overlay.
    If the input value is acceptable
        Set the error condition to false
    Else
        Display an error message

************************************************************
Format-Loop.
************************************************************
    If a different overlay is required
        perform New-Overlay-Process Initialize formulas.
    Open Data Entry Intermediate file for input.
    Move spaces to segment work area.
    Position at first element in overlay.
    Perform Format-Process
        until end of transaction.
    Perform Close-Process.
    Get next transaction in list to format.

Format-Process.
    Locate the current segment in the overlay based on the
        current element.
    If element is a constant
        Move constant value to intermediate element value
    Else
    If element is a formula
        Move calculated formula value to intermediate element
            value
    Else
        Locate element on Data Entry Intermediate file (to use
            intermediate element value from file)

If the current segment is not the segment that is in the
      segment work area
        Calculate any formulas depending on values in this
            segment
        Perform Write-Segment
```

FIGURE 4(B)

```
Format the  intermediate element value according to its data
    type, minimum length, and maximum length.
Place an element separator  in the  current position  of the
    segment work  area, and  increment the current position
    of the segment work area.
Place the intermediate element  value into  the segment work
    area  starting  at  the current position, and increment
    the current position to  point  to  the  character just
    past the  end of  the data that were just placed in the
    segment work area.
Reference next element in overlay.

New-Overlay-Process.
    If X12 formatted transaction file is open
        perform Close-Process Open X12 formatted file for output
    Write the X12 Interchange, group, and transaction
        headers.
    Load dictionary structured transaction overlay.

Close-Process.
    Perform Write-Segment.
    Write X12 transaction, group, and interchange trailers.
    Close X12 formatted file.

Write-segment.
    Strip any trailing element  separators from  the end  of the
        segment work  area,  decrementing the current position
        for each element separator stripped.
    Place a segment terminator  at the  current position  of the
        segment work area.
    Write the segment work area to the X12 formatted data file.
    Move spaces to the segment work area.
    Move the current segment name to the segment work area.
    Set the  current position  of the  segment work  area to the
        position immediately following the segment name.
```

FIGURE 4(C)

```
***********************
X12-TO-PRINT-FORMAT-MAIN.
***********************
     Load dictionary structured transaction overlay.
     Load flatfile image which was created during the build
         process for the current overlay.
     Initialize flatfile image work file.
     Set first-line to 99, last-line to 0
     Open X12 data file for input.
     Position to first segment in X12 data file.
     Perform Segment-Loop
         until end of transaction.
     Perform Print-Image-Process.
     Close files.
     Stop Run.

*************************************************************
Segment-Loop.
*************************************************************
     Locate segment in overlay  (by segment  name or  use of type
         'K' elements).
     If segment is defined in the overlay
         Get first element in segment
         Perform Element-Loop thru Element-Loop-Exit
             until all elements in segment have been processed
     .
     Get the next segment in the input X12 transaction.

Element-Loop.
     If element is blank
         Get next element in segment
         go to Element-Loop-Exit
     .
     Locate proper element description in overlay.
     If element has a default code of 'S'
         Use  this  element  to  establish a qualifier/qualified
             relationship for printing
         Go to Element-Loop-Exit
     .
     Use line  and  column  positions  contained  in  the overlay
         element description to find the position into which the
         current element data are to be placed.
     If this element will overlay a value already loaded into the
         print image work file
             Perform Print-Image-Process
     .
```

FIGURE 5(A)

```
        Place the element data into the print image work file at the
            position in the line  indicated by  the overlay element
            description.
        If current specified line is greater than last-line
            Move current line to last-line
        Else
        If current specified line is less than first-line
            Move current line to first-line
        .
        Get the next element in the segment.
    Element-Loop-Exit.
        Exit.

Print-Image-Process.
        Print  the   print  image   work  file  from  first-line   to
            last-line.
        Initialize the print  image  work  file  from  first-line to
            last-line.
        Set first-line to 99, last-line to 0.
```

FIGURE 5(B)

```
***************************
FLAT-FILE-TO-X12-FORMAT-MAIN.
***************************
    Position to first transaction in flat file.
    Perform Format-Loop
        until end of flat file.
    Perform Close-Process.
    Close Flat file.
    Stop Run.

*****************************************************
Format-Loop.
*****************************************************
    If a different overlay is required
        perform New-Overlay-Process
    .
    Initialize formulas.
    Move spaces to segment work area.
    Position at first element in overlay.
    Perform Format-Process thru Format-Process-Exit
        until a new header record is encountered
            or end of flat file.

Format-Process.
    Locate the current segment in the overlay based on the
        current element.
    If element is a constant
        Move constant value to flat element value
    Else
    If element is a formula
        Move calculated formula value to flat element value
    Else
        Locate element from flat file
        If a header record is encountered in the flat file
            or the end of the flat file is reached
                go to Format-Process-Exit
    .
    If the current segment is not the segment that is in the
      segment work area
            Calculate any formulas depending on values in this
                segment
            Perform Write-Segment
    .
    Format the flat element value according to its data type,
        minimum length, and maximum length.
    Place an element separator in the current position of the
        segment work area, and increment the current position
        of the segment work area.

Place the intermediate element value into the segment work
        area starting at the current position, and increment
        the current position to point to the character just
        past the end of the data that were just placed in the
        segment work area.
    Reference next element in overlay.

Format-Process-Exit.
    Exit.
```

FIGURE 6(A)

```
New-Overlay-Process.
    If X12 formatted transaction file is open
        perform Close-Process
    .
    Open X12 formatted file for output
    Write the X12 Interchange, group, and transaction
        headers.
    Load dictionary structured transaction overlay.

Close-Process.
    Perform Write-Segment.
    Write X12 transaction, group, and interchange trailers.
    Close X12 formatted file.

Write-segment.
    Strip any  trailing element  separators from  the end of the
        segment work area,  decrementing  the  current position
        for each element separator stripped.
    Place a  segment terminator  at the  current position of the
        segment work area.
    Write the segment work area to the X12 formatted data file.
    Move spaces to the segment work area.
    Move the current segment name to the segment work area.
    Set the  current position  of the  segment work  area to the
        position immediately following the segment name.

***********************
X12-TO-FLAT-FORMAT-MAIN.
***********************
    Load dictionary structured transaction overlay.
    Load  flatfile  image  which  was  created  during the build
        process for the current overlay.
    Initialize flatfile image work file.
    Set first-record-type to 99, last-record-type to 0
    Open X12 data file for input.
    Open the flat file for output.
    Position to first segment in X12 data file.
    Perform Segment-Loop
        until end of transaction.
    Perform Flat-Image-Process.
    Close files.
    Stop Run.

*************************************************************
Segment-Loop.
*************************************************************
    Locate segment in overlay  (by segment  name or  use of type
        'K' elements).
    If segment is defined in the overlay
        Get first element in segment
        Perform Element-Loop thru Element-Loop-Exit
            until all elements in segment have been processed
    .
    Get the next segment in the input X12 transaction.

Element-Loop.
    If element is blank
        Get next element in segment
        go to Element-Loop-Exit
    .
    Locate proper element description in overlay.
```

FIGURE 6(B)

```
If element has a default code of 'S'
    Use this element to establish a qualifier/qualified
        relationship for printing
    Go to Element-Loop-Exit Use record type and position contained in the overlay
    element description to find the position into which the
    current element data are to be placed.
If this element will overlay a value already loaded into the
    flat image work file
    Perform Flat-Image-Process Place the element data into the flat image work file at the
position in the record indicated by the overlay element
description.

If current specified line is greater than last-record-type
        Move current line to last-record-type
    Else
If current specified line is less than first-record-type
        Move current line to first-record-type Get the next element in the segment
Element-Loop-Exit.
    Exit.

Flat-Image-Process.
    Write the flat image work file from first-record-type to
        last-record-type.
    Initialize the flat image work file from first-record-type
        to last-record-type.
    Set first-record-type to 99, last-record-type to 0.
```

FIGURE 6(C)

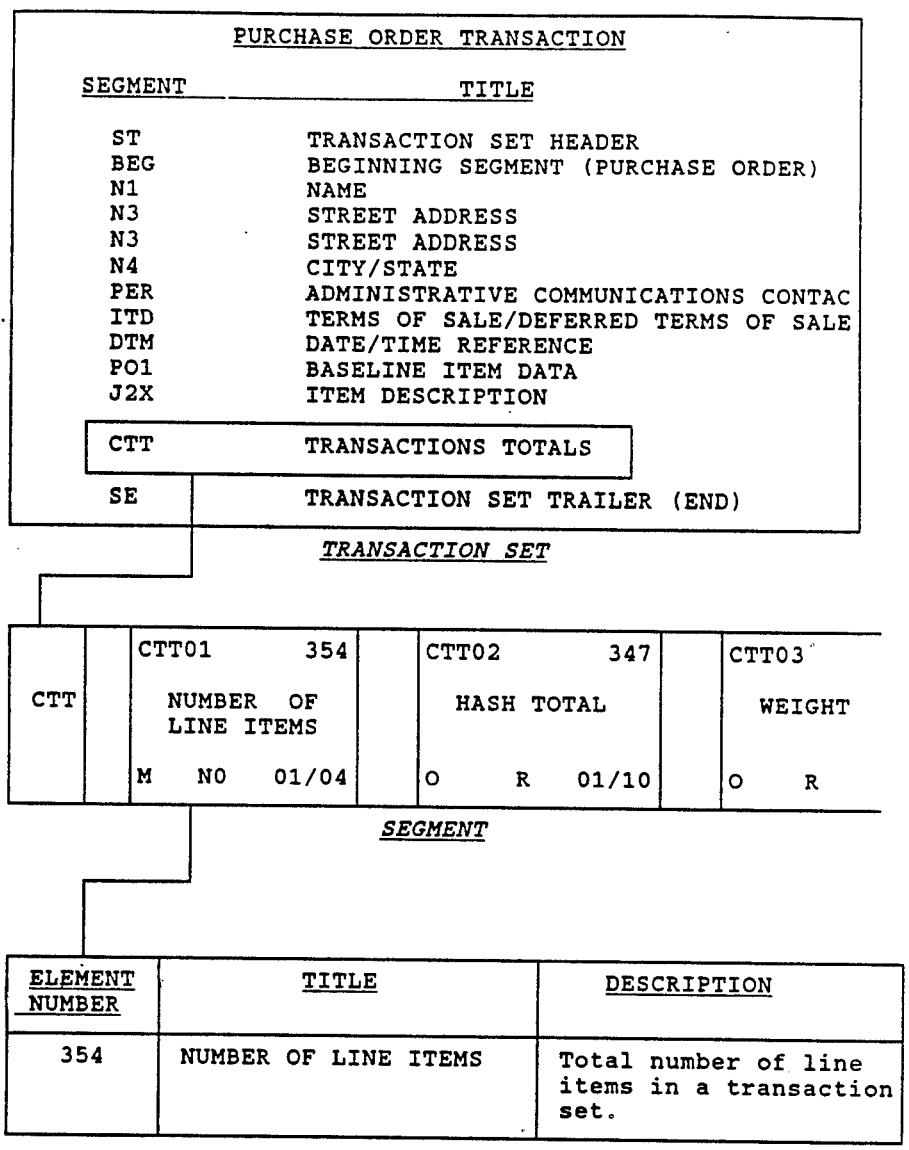

| SEGMENT | TITLE |
|---|---|
| ST | TRANSACTION SET HEADER |
| BEG | BEGINNING SEGMENT (PURCHASE ORDER) |
| N1 | NAME |
| N3 | STREET ADDRESS |
| N3 | STREET ADDRESS |
| N4 | CITY/STATE |
| PER | ADMINISTRATIVE COMMUNICATIONS CONTAC |
| ITD | TERMS OF SALE/DEFERRED TERMS OF SALE |
| DTM | DATE/TIME REFERENCE |
| PO1 | BASELINE ITEM DATA |
| J2X | ITEM DESCRIPTION |
| CTT | TRANSACTIONS TOTALS |
| SE | TRANSACTION SET TRAILER (END) |

*TRANSACTION SET*

| CTT | CTT01 354 NUMBER OF LINE ITEMS M NO 01/04 | CTT02 347 HASH TOTAL O R 01/10 | CTT03 WEIGHT O R |
|---|---|---|---|

*SEGMENT*

| ELEMENT NUMBER | TITLE | DESCRIPTION |
|---|---|---|
| 354 | NUMBER OF LINE ITEMS | Total number of line items in a transaction set. |

*ELEMENT*

FIGURE 7

```
Your Company Name Goes Here

MAINTAIN SYSTEM AND SECURITY FILEs
_____

1   CONFIGURATION                    ┌─ 10   ELEMENTs

2   TRADING PARTNERs                 ├─ 11   SEGMENTs

3   PART NUMBER CROSS REFERENCE      ├─ 12   TRANSACTIONs
                                     │
4   LOG-ONs                          └─) These items represent the (three tier)
                                         dictionary-defined transaction formats.
5   SECURITY                             Specifically incorporated here are the
                                         ANSI ASC X12 and TDCC dictionaries (which
6   DATA ENTRY OVERLAYs ──────┐          are co-mingled).

7   PRINT OVERLAYs ───────────┤
                              ├─) This is a Supply Tech product in which the
8   X12 TO FLAT OVERLAYs ─────┤      Overlay Generator is used to generate
                              │      dictionary-structured transaction formats.
9   FLAT TO X12 OVERLAYs ─────┘ nn=Select, E=Exit                                              Option:
Enter option
```

FIGURE 8

Your Company Name Goes Here

STX12 MAIN MENU
_____

1   MAINTAIN SYSTEM AND SECURITY FILEs    ⎡─ 10   ENTER INVOICEs

2   SEND/RECEIVE TRANSACTIONs             ├─ 11   ENTER PRODUCTION RELEASEs

3   PROCESS INCOMING TRANSACTIONs         ├─ 12   ENTER PURCHASE ORDERs

4   PROCESS OUTGOING TRANSACTIONs         ├─ 13   ENTER PURCHASE ORDER ACKNOWLEDGE

5   ARCHIVE TRANSACTIONs                  ├─ 14   ENTER ADVANCE SHIP NOTICEs

6   RESTORE TRANSACTIONs             ⎡────┴─ 15   ENTER PRODUCTION STATUSs
                                     ⎣─)These menu items direct the user to trading
7   PRINT MANAGEMENT REPORTs             partner-specific data entry screens which are
                                         generated via an overlay. The entered data are
8   CONVERT X12 TO FLAT FILE ─⎤          translated also using the overlay.
                              ├─)These menu items invoke the translation
9   CONVERT FLAT FILE TO X12 ─⎦ between transactions in a dictionary-
                                         structured formats to/from fixed file formats
nn=Select,E=Exit                         using an overlay.          Option:
Enter option

FIGURE 9

```
Your Company Name Goes Here

DATA ENTRY OVERLAYs SELECTION
_____

OVERLAY CODE        TRANSACTION CODE
        ---                 ---
        DU1                 850         PURCHASE ORDER nn=Select,A=Add,S=Search,C=Copy,D=Delete,M=Mrg,X=Xtract,E=Exit    Option: A
Enter option
```

FIGURE 10A

```
Your Company Name Goes Here              DU1:850 - PURCHASE ORDER

DATA ENTRY OVERLAY SEGMENT SELECTION

SEGMENT    OCCURS    LOOPS
        ---

1    ST         1                  TRANSACTION SET HEADER
    2    BEG        1                  BEGINNING SEGMENT (PURCHASE ORD)
    3    N1         1                  SELLER
    4    N2         1                  ADDRESS
    5    N3         1                  ADDRESS
    6    N4         1                  CITY/STATE/ZIP
    7    N1         1                  SHIP-TO
    8    N2         1                  ADDRESS
    9    N3         1                  ADDRESS
   10    N4         1                  CITY/STATE/ZIP
   11    PO1        1        10000     BASELINE ITEM DATA
   12    J2X        3                  DESCRIPTION
   13    CTT        1                  TRANSACTION TOTALS
   14    SE         1                  TRANSACTION SET TRAILER nn=Sel,A=Add,D=Dlt,B=Build,V=View,P=Print,T=Trn Hdr,E=Exit    Option:
Enter option
```

FIGURE 10B

```
Your Company Name Goes Here                              DU1:850 - PURCHASE ORDER DATA ENTRY OVERLAY SEGMENT UPDATE       BEG - BEGINNING SEGMENT (PURCHASE ORDER)
_____

SEGMENT POSITION        SEGMENT CODE         SEGMENT NAME
--                      ---                  ----------------------------------
02                      BEG                  BEGINNING SEGMENT

REQUIREMENT CODE        MAXIMUM USE          TYPICAL USE
-                       ------               --
M (M)                   000001 (000001)      01

POSITION OF SEGMENT THAT ENDS LOOP           MAXIMUM LOOPS
--                                           ------
00 (N1)                                      000000 (000001)

C=Change,V=View,E=Exit           Option:
Enter option
```

FIGURE 10C

```
Your Company Name Goes Here                    DU1:850 - PURCHASE ORDER

DATA ENTRY OVERLAY ELEMENT SELECTION   BEG - BEGINNING SEGMENT (PURCHASE ORDER)
_____

SEGMENT      POSITION    ELEMENT
                    --
    1  BEG          01          353        C - TRANSACTION SET PURPOSE
    2  BEG          02          092        C - PURCHASE ORDER TYPE
    3  BEG          03          324            P.O. NUMBER
    4  BEG          06          323            P.O. DATE nn=Select,A=Add,D=Delete,M=Move,V=View,U=Update Seg,E=Exit      Option:
Enter option
```

FIGURE 10D

```
Your Company Name Goes Here                    DU1:850 - PURCHASE ORDER

DATA ENTRY OVERLAY ELEMENT UPDATE    BEG - BEGINNING SEGMENT (PURCHASE ORDER)
_____

ELEMENT POSITION    ELEMENT CODE    DESCRIPTION
--                  ---             ----------------------------------------
06                  323             P.O. DATE

DATA TYPE           REQUIREMENT CODE  MINIMUM LENGTH   MAXIMUM LENGH
--                  --                ---              ---
DT (DT)             M (M)             006 (006)        006 (006)

DEFAULT CODE        DEFAULT VALUE                      EDIT VALUE
-                   ---------------------------        ----------------------
D                   =TODAY                             =FROM -1 TO 1

C=Change,V=View,E=Exit                              Option:
Enter option
```

FIGURE 10E

```
Your Company Name Goes Here          DU1:850 - PURCHASE ORDER

DATA ENTRY OVERLAY ELEMENT UPDATE    BEG - BEGINNING SEGMENT (PURCHASE ORDER)
_____  _____  _____  _____ _  _____  _____

----------------------------SCREEN-BUILDING-OVERRIDES--------------------------

HEADINGS                     ELEMENT POSITIONING
        ------------------------     0 = DEFAULT POSITION
LINE 1:                              1 = CALCULATED POSITION
LINE 2:                              4 = START NEW SCREEN
LINE 3:P.O. DATE                     -
                                     1

HEADINGS (Y or N)    DASHES (Y or N)
       -                    -

C=Change,V=View,E=Exit                         Option:
Enter option
```

FIGURE 10F

```
Your Company Name Goes Here                        DU1:850 - PURCHASE ORDER

DATA ENTRY OVERLAY TRANSACTION HEADER
_____  _____  _____  _____  _____
---------------------------SCREEN-BUILDING-DEFAULTS---------------------------
COLUMN WIDTH    MINIMUM GAP BETWEEN FIELDS    REVERSE VIDEO ON ENTRY (Y/N)
--              --                            -
01              02                            N

DEFAULT LINE SPACING                          MANDATORY FIELD CHARACTER
--                                            -
01                                            *

HEADINGS (Y/N)  DASHES (Y/N)                  CONTINUATION CHARACTER
-               -                             -
Y               N                             =

OVERLAY DESCRIPTION
----------------------------------------
PURCHASE ORDER

C=Change,V= View,E=Exit                       Option:
Enter option
```

FIGURE 10G

```
Your Company Name Goes Here          DU1:850 - PURCHASE ORDER
                                     BEG - BEGINNING SEGMENT (PURCHASE ORDER)
DATA ENTRY OVERLAY SCREEN MODIFICATION   03 - P.O. NUMBER
_____

P.O. NUMBER                          P.O. DATE
 *=DOCUMENTR                          *=TODAY

SELLER ORGANIZATION                  SHIP-TO ORGANIZATION
  =SE-ADDR1                            =ST-ADDR1
  =ADDR2                               =ADDR2
  =ADDR3
  =CITY            =S    =ZIP          =CITY             =S      =ZIP

QTY        U/M    UNIT PRICE      VENDOR'S PART NO
   *

ITEM DESCRIPTION
   =

=

=

↑,↓,→,←, Enter to save position of field, ESC to cancel move    Option:
```

FIGURE 10H

DATA ENTRY SCREEN MAPPED USING DU1:850 DATA ENTRY OVERLAY

|     | X1 | X2   | X3 | X4 | X5   |
|-----|----|------|----|----|------|
| Y1  |    |      |    |    |      |
| Y2  |    |      |    |    | E324 |
| Y3  |    | E323 |    |    |      |

FIGURE 12

MAPPING PROCESS FROM DATA ENTRY SCREEN TO TRANSMISSION FORMAT

Keyed Data + Data Entry Overlay ==> Data Stream for Transmission

D1 (X5,Y2)    DU1:850 PO Overlay
           +                       ==> ...BEG*E353*E092*D1***D2...
D2 (X2,Y3)    (See FIGURE 11)

FIGURE 13

METHOD AND APPARATUS FOR ELECTRONIC DATA INTERCHANGE

MICROFICHE APPENDIX

This application contains a microfiche appendix of 5 software modules A, B, C, D and E. Module A has 2 microfiche with a total of 75 frames (including test target and description frames), Module B has 6 microfiche with a total of 331 frames (including test target and description frames), Module C has 2 microfiche with a total of 117 frames (including test target and description frames), Module D has 1 microfiche with a total of 28 frames (including test target and description frames), and Module E has 1 microfiche with a total of 24 frames (including test target and description frames).

A portion of the disclosure of this patent document contains material which is subject to copyright protection. The copyright owner has no objection to facsimile reproduction by anyone of the patent document or the patent disclosure, as it appears in the Patent and Trademark Office patent file or records, but otherwise reserves all copyright rights whatsoever.

BACKGROUND

1. Technical Field

This invention relates to programmable machine systems, and more particularly, to methods and apparatus for defining the formats of business transactions for the purposes of entering, outputting, printing and translating data which normally will be transmitted and received among trading partners.

2. Discussion

Traditionally, business transactions among trading partners have been documented primarily on paper thereby resulting the self-evident problems associated with the storage and transmittal of a large number of physical documents. In an attempt to overcome these problems, the trend has been to use electronic data interchange (EDI) to transmit and receive various business transactions among trading partners. Examples of such transactions include Releases, Advance Ship Notices, Purchase Orders, Purchase Order Acknowledgements, Requests for Quotes, Quotes, Invoices and Bank Remittances. Thus, instead of documenting these transactions on paper, the data are transmitted electronically (typically via a modem or digital data line connection) between computer systems operated by each trading partner. There may or may not be involved a third party service to receive, store, and forward these electronic business transactions.

In order to permit the translation and use of documents exchanged between the computer systems, there must be established some type of standards for the definition of transactions. Such standards that have been implemented include ANSI ASC X12 (set up by the American National Standards Institute), EDIACT (Electronic Data Interchange for Administration, Commerce and Transport) and TDCC (Transportation Data Coordinating Committee) formats. These formats utilize element, segment and transaction dictionaries. These dictionaries are extremely flexible in that they have only a few mandatory requirements and a wide variety of options. Thus, a particular trading partner can specifically tailor a business transaction such as an Invoice to its own needs while still being within the standard format.

For purposes of this invention, the term "dictionary-defined" transaction format is a format which has been agreed upon by a standard's organization which may be comprised of a group of trading partners, agencies, countries, departments within an organization, etc. that use a three-tiered dictionary concept. The 3 tiers are as follows:

(1) Tier 1 is the definition and identification of individual, unit data items known as elements. Examples of elements are date, date qualifiers, quantity, items number etc. An element consists of a datum having an assigned fixed data length or variable data length.

(2) Tier 2 is the definition of records known as segments which are uniquely identified and consist of particular groupings of elements in a particular organization for the ultimate purpose of defining a part of a transaction. Preferably, but not necessarily, the grouping of elements in a particular segment should have some logical relationship. Some elements may be required and others may be optional within a particular segment.

(3) Tier 3 is the complete and full definition of transactions which are uniquely identified. Transactions are defined in terms of their segments in a particular order. Some segments may be required and others may be optional in a particular transaction definition. Also, groups and subgroups of segments within a transaction may be further defined to indicate multiple repetitions or iterations of the group and/or subgroup (loops).

The flexibility provided by dictionary-defined transactions unfortunately also causes some real-world problems. In practice, larger trading partners are individually tailoring the information required in each of their transactions so that, while they do meet the dictionary-defined format, the completed transaction formats chosen by each are quite different. Thus, if one trading partner wants to do business via EDI with a variety of other trading partners, at least one of the trading partners must be capable of configuring and utilizing its computer system so that it can meet all of the requirements dictated by the other trading partners. For purposes of this invention, the term "dictionary-structured" transaction format is one that meets or approximates the guidelines of a dictionary-defined format but is individually tailored by a given trading partner. Thus, a "dictionary-structured" transaction format may be the same as, may be different from, may deviate from, may be a subset of, or may be a superset of that format specified by the "dictionary-defined" format guidelines.

There are several software programs for use with electronic data exchange currently on the market. They include:

EDI*PC ™ (General Electric Corporation; Rockville, Md.)

TELINK ™ (EDI, Inc.; Hanover, Md.)

METRO * Translator ™ (Metro.Mark Integrated System, Inc.; Roslyn, NY)

However, prior to the present invention, they are believed to have had the following drawbacks:

They attempt to produce trading partner specific transactions through a combination of operator selective input with a generalized format covering multiple trading partners.

They cannot produce exacting dictionary-structured transaction formats and "other part" formatting to the specific trading partner requirements as is done by the present invention.

SUMMARY OF THE INVENTION

The present invention enables a trading partner to define the formats of a dictionary-structured business transaction which provide the basis for the subsequent entry and translation of business transaction data for transmission among a variety of other trading partners. All this can be accomplished without requiring programming changes to the user's machine system.

The programmable machine system according to the preferred embodiment of the present invention includes an input means for defining a dictionary-structured transaction format that has a plurality of elements in a particular organization. Provision is made for selecting a particular system component such as a printer, screen or the like which is typically not well suited for using the dictionary-structured format to interface with a human operator. An overlay generator generates an overlay that includes a second format associated with the selected system component. The second format has elements or fields that are related to the elements in the dictionary-structured format. The overlay generator also generates a mapping between the related elements of the two formats. Data that are entered in the second format are translated into the dictionary-structured format so that they can be later transmitted in that format to a trading partner. Also, data received in a dictionary-structured format from a trading partner can be translated into the second format.

BRIEF DESCRIPTION OF THE DRAWINGS

The various advantages to the present invention will become apparent to those skilled in the art upon reading the following specification and by reference to the drawings in which:

FIG. 2 is a high level flowchart illustrating the major steps performed by the programmable machine system in carrying out certain aspects of the invention;

FIG. 4 (A-C) is a pseudocode flow diagram of how an overlay is used programmatically for data entry and subsequent translation into a dictionary-structured transaction;

FIG. 5 (A-B) is a pseudocode flow diagram of how an overlay is used programmatically for translating dictionary-structured transactions into formatted printed output;

FIG. 6 (A-C) contains two pseudocode flow diagrams of (1) how an overlay is used programmatically for translating transactions into dictionary-structured formats from into formats composed of fixed-field, fixed-length records contained in a file, and (2) how an overlay is used programmatically for translating transactions into formats composed of fixed-field, fixed-length records contained in a file from dictionary-structured formats;

FIG. 7 is a diagram showing the relationship among the three tiers (element, segment, transaction) of dictionary-defined transactions and dictionary-structured transactions;

FIG. 8 is a submenu which shows how the overlay generator is accessed and how the three-tier dictionary of dictionary-defined transactions is accessed;

FIG. 9 is the main menu which shows how data entry and file translation, which require overlays, are invoked;

FIG. 10A is a representation of a screen which is used to identify a data entry overlay;

FIG. 10B is a representation of a screen which is used to add and delete segments used in an overlay;

FIG. 10C is a representation of a screen which is used to define or change the attributes of a segment used in a particular overlay;

FIG. 10D is a representation of a screen which is used to add and delete elements used in a particular overlay;

FIGS. 10E and 10F are a representation of screens which are used to define or change the attributes of an element used in a particular overlay;

FIG. 10G is a representation of a screen which is used to define or change the overall data entry screen attributes used by the Overlay Generator when it builds the data entry screen associated with a particular data entry overlay;

FIG. 10H is a representation of a screen which shows the actual physical appearance of a data entry screen;

FIG. 12 is a matrix representation of the relationship of the elements in a data entry overlay to the coordinate position of their associated fields on a data entry screen; and FIG. 13 is a representation of the elements on a data entry overlay to their position in the transmission data stream in dictionary-structured format.

DESCRIPTION OF THE PREFERRED EMBODIMENT

Figure 1:
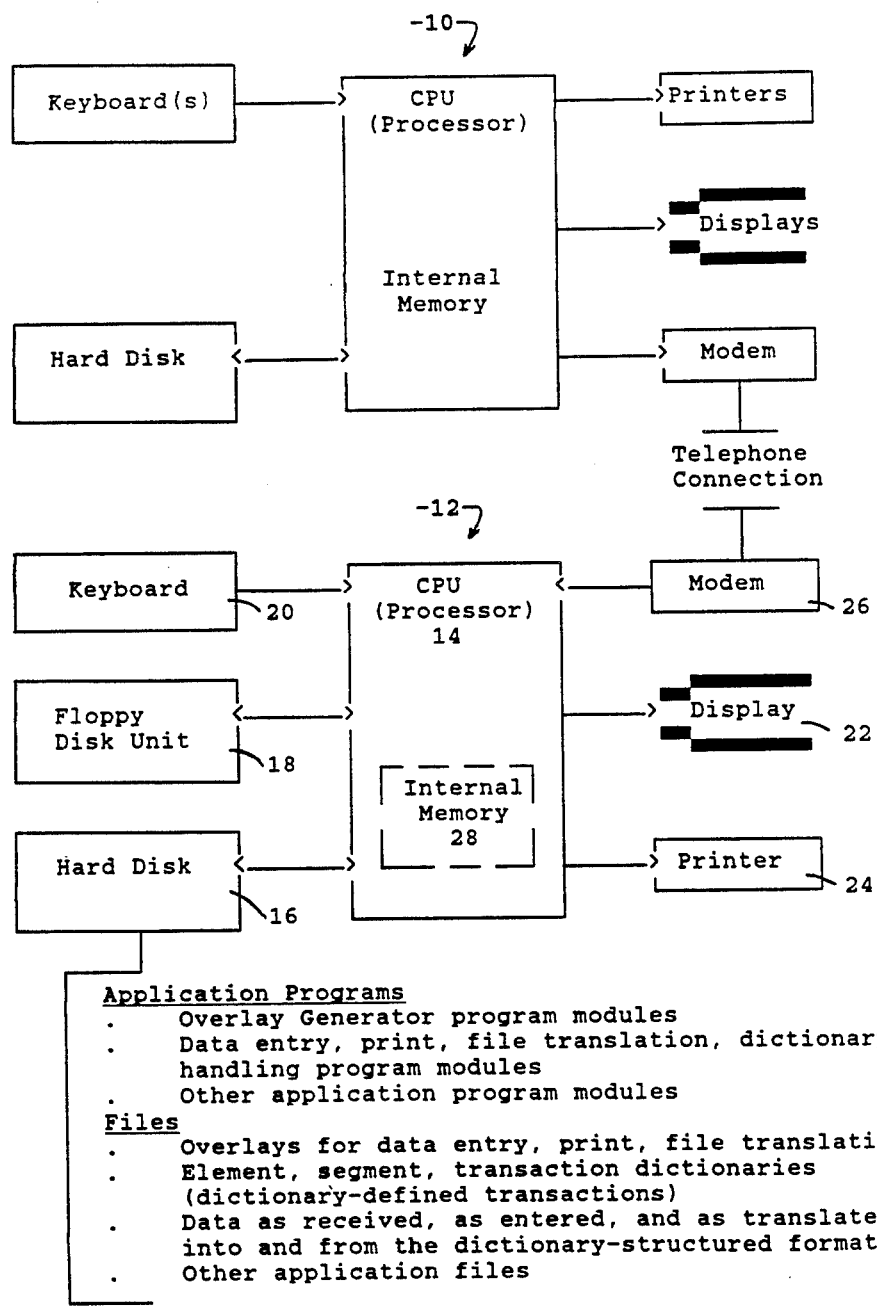
FIG. 1 is a schematic diagram illustrating programmable machine systems of two trading partners utilizing the present invention.

FIG. 1 illustrates a communication network for performing electronic data interchange between the programmable machine systems 10 and 12 of various trading partners. In order to simplify the description of the present invention and to provide a concise description of the best mode for practicing this invention, it will be described in connection with a specific example utilizing programmable machine system 12. However, it should be understood at the outset that this invention can be used by different computer equipment and implemented in different software languages.

Assume that the machine system 10 belongs to a large customer and that machine system 12 belongs to a vendor of that customer. The customer will often dictate the dictionary-structured transaction format that all of its vendors must use. One of its primary features is that the present invention permits the vendor's computer system to define, enter and translate business transaction data for transmission not only to just one customer but also to other customers which may and usually have different dictionary-structured transaction format requirements.

The basic system configuration includes an IBM microcomputer such as an IBM XT, AT, PS/2 or any IBM compatible microcomputer that uses an MS-DOS operating system and which can accommodate the boards and devices of the following system components. The processor 14 communicates with a fixed hard disk 16 of 10 megabytes or more as well as with floppy disk drive(s) 18. A terminal including a keyboard 20 and display screen 22 provides a user interface with input- /output capabilities. A printer 24 with parallel interface is employed for providing hard copy. Finally, a modem 26 is used to provide bidirectional communication between processors of the various trading partners.

The processor 14 operates under the instructions of an application program which is typically contained on a hard disk and entered into the internal memory 28 of the processor in a conventional manner via disk drive 18. The application program of the specific embodiment of this invention was written in the COBOL language and compiled by a compiler commercially available under the trademark "Professional COBOL", supplied by Microfocus, 2463 E. Bashore Road, Palo Alto, Calif.

The application program contains various modules as illustrated in FIG. 1. These modules are periodically loaded into the processor 14 depending upon which functions the user desires to perform as indicated by his commands entered into the keyboard 20. The present invention is particularly concerned with the module which will be referred to as the "Overlay Generator". The source code for the Overlay Generator module is found in the microfiche appendix.

The overlay generator module is used for a variety of purposes. FIG. 4(A-C) describes how an overlay is used to enter data via the keyboard 20 and later to translate it into a dictionary-structured transaction ready for transmission to a trading partner. FIG. 5(A-B) describes how an overlay is used for translating dictionary-structured transaction data (e.g., received from a trading partner via modem 26) into formatted printed output for use on the printer 24. This capability is useful for viewing or printing the transaction in a more user friendly format since the data, as received, are in a format that is not very understandable by ordinary human operators. The second half of FIG. 6(A-C) describes how an overlay is used to translate dictionary-structured transaction data into formats composed of fixed-field, fixed-length records contained in a file. This capability is useful for presenting the data in a consistent, fixed format that can be more easily processed by other application programs. The first half of FIG. 6(A-C) describes how fixed-field, fixed-length records contained in such a file can be translated into a dictionary-structured transaction format ready for transmission to a trading partner or for other purposes. The foregoing text will concentrate on describing how one particular overlay is generated and used for entering data which are stored on hard disk 16. Once the data are stored in a dictionary-structured format using the overlay, it can be used in a variety of manners as described in connection with FIGS. 5 and 6 above. In addition, it can be transmitted to the trading partner via modem 26. Likewise, transaction information received via modem 26 from a trading partner can be stored in hard disk 16, with the overlay generator module being capable of translating it into more user-friendly form such as mapping the data entries onto appropriate pixel positions or fields on display 22. Thus, while the foregoing description will focus in on a specific example, it should be understood that the present invention has a much broader applicability.

The hard disk 16 is used primarily for both storing computer application programs and records or files of data that can be accessed by the processor 14. The stored data include the dictionaries corresponding to the tier 1, tier 2 and tier 3 structure for a dictionary-defined transaction as discussed above. FIG. 7 illustrates the conceptual relationship between the information in the transaction, segment and element dictionaries. The element dictionary, being the most basic, includes an identification code (e.g., 354), a title (e.g., "Number of Line Items"), data type (e.g., "N0"), and the minimum and maximum data field lengths (e.g., "1" and "4", respectively). The segment dictionary includes an identification code and one or more functionally related elements positioned in a defined sequence. The identification code CTT in FIG. 7 thus defines a segment utilizing element numbers 354, 347, etc. in that order. Also included is the designator (M or O) which indicates whether or not the element is required (mandatory) or optional in this segment. The transaction dictionary stored on disk 16 includes an identification code for each transaction (e.g., "850" denotes a Purchase Order transaction), and one or more functionally related segments in a defined sequence. Also included is a designator which indicates whether or not the segment is required (mandatory) or optional in this transaction. The transaction dictionary would contain both the mandatory and optional segments for each transaction.

In practice, a trading partner will decide what information it will require for particular transactions and typically provide each of its trading partners with a manual (implementation guide) which sets forth the chosen dictionary-structured format. Thus, the first task is to appropriately configure the trading partner's system 12 so that it can accommodate the demands dictated by others for performing electronic data interchange therewith.

Upon starting up the system, the screen 22 will display the main menu set forth in FIG. 9. By selecting the option labeled "Maintain System and Security Files" the menu of FIG. 8 will be displayed. Pursuant to the present invention, an overlay is first generated for each selected system component (also sometimes referred to as the "other part"). A system component can be any device (e.g. printer, screen, disk, etc.) where information is preferably communicated in a more desirable user-friendly or application-friendly format than the dictionary-structured format. In FIG. 8, overlays can be generated by entering one of the options 6 through 9. Option 6 is associated with the display 22 and keyboard 20 for purposes of entering data. Option 7 is associated with the printer 24 whereas options 8 and 9 enable other system components to provide certain desirable conversions of data listings.

A data entry overlay for subsequent use for data entry onto hard disk 16 via keyboard 20 and display 22 may be constructed so as to be very specific and to minimize keyboard input. This is accomplished by: selecting only the segments and elements required; using reserved words to call up data (such as address) from other files and to define data edits; designating element values as constants, formulae, or defaults; changing the length of the element; changing the element name; and positioning the data field represented by that element on the display 22.

The first step in this process is to enter Option 6 (FIG. 8) and proceed to define the overlay by entering an Overlay Code and a Transaction Type Code in the spaces provided in the screen of FIG. 10A. The Transaction Type Code typically is that of the corresponding dictionary-defined transaction. Examples of ANSI ASC X12 Transaction Type Codes are: Invoice=810, P.O.=850. The Overlay Code normally designates a particular trading partner. Thus, the screen of FIG. 10A illustrates that a Purchase Order (for trading partner DU1) has been entered.

Segments are now added or deleted to each overlay using the manipulation capabilities of the Overlay Generator module. The screen format shown in FIG. 10B is for a given Overlay (DU1:850) which is accessed when a given transaction is defined and entered in the screen of FIG. 10A. The software automatically fetches those mandatory segments from the stored dictionary for the given transaction and displays them on the screen. Then, the user is given the opportunity to modify this basic set of segments. The segments which make up the dictionary-structured transaction are identified by their Segment IDs in FIG. 10B which are the same as those assigned to the corresponding dictionary-defined transaction. The user can edit this screen as desired to select the segments, and "Occurs" and "Loops". Some segments are repeated multiple times at their specific location in the transaction. "Occurs" refers to the maximum number of times a segment is permitted to appear at that location. Within transactions, specific groups of logically related segments occur repetitively. The repetition of a group is referred to as a "loop".

The attributes of each segment can be further modified to the exact requirements of the desired dictionary-structured transaction using the manipulation capabilities of the Overlay Generator using the screen format shown in FIG. 10C by entering the appropriate line number in FIG. 10B associated with the segment that is desired to be modified. These further attributes are as follows:

SEGMENT NAME A field for the name of the particular segment.
REQUIREMENT to be
  O=Optional. The segment does not need to be used.
  M=Mandatory. This segment must be used in the Transaction.
  F=Floating.
MAXIMUM USE The maximum allowable number of times this segment may be used at this location in the transaction. The number enclosed in the parentheses is the dictionary-defined number allowed for the maximum use but is not a limiting factor.
TYPICAL USE This is the number of times the elements in this segment are to appear as a table on the data entry screen. This field is only relevant if the "Maximum Use" is greater than one, and all the elements will fit one line on a screen.
POSITION OF SEGMENT THAT ENDS LOOP If this segment is the first segment of a loop, this field indicates the last segment in the loop. If this segment does not start a loop, this value must be zero.
MAXIMUM LOOPS If this segment is the first segment of a loop, this is the maximum number of times it can complete the loop. The number in this field must be zero if there is no loop.
HL LEVEL (Hierarchical Level) allows you to depict, flexibly, the relationships among HL segments. This field shows, relatively, where this HL falls in relationship to others defined. For example, the Shipment HL may be designated level "1", the Order HL may be designated level "3", and the Item HL may be designated "6".

The fields labeled "SEGMENT POSITION" refer to the ordinal position that the segment being defined holds within this rendition of this transaction. The field labeled "SEGMENT CODE" refers to the segment ID, the 2-to-3 characters which identifies the segment.

The elements within each segment now can be added or deleted using the manipulation capabilities of the Overlay Generator using the screen format shown in FIG. 10D. The elements for each segment which make up the dictionary-structured transaction are identified by their relative position within segment. (Note that elements 4 & 5 have been deleted in the previous step.)

The attributes of each element can be modified to the exact requirements of the desired dictionary-structured transaction using the screen format shown in FIG. 10E which is accessed by entering the appropriate sequence number in FIG. 10D. As with the segments, the fields labeled "ELEMENT POSITION" and "ELEMENT CODE" refer to each element's position within that segment and its dictionary-defined code. The modifiable attributes are as follows:

ELEMENT CODE This is the code of the element that belongs in this sequential position of the segment being defined.
DESCRIPTION Free-Form Description.
DATA TYPE Defines the type of data the element must contain. Codes are:
  AN Alphanumeric
  ID Identifier (Must be specific code as defined by ANSI)
  NN Fixed Decimal Numeric
  DT Date
  TM Time (24 hour clock HHMM format)
  R Floating Decimal Point Numeric
REQUIREMENT CODE Mandatory, optional, or conditional.
MINIMUM LENGTH Minimum number of characters the element must contain. If the Element Type is "N" or "R", this count does not include the sign or decimal point.
MAXIMUM LENGTH Maximum number of characters the element can contain. If the Element Type is "N" or "R", this count does not include the sign or decimal point.
DEFAULT CODE
  BLANK "Default Value" is not used.
  D Default. When the data entry screen s used, the contents of the "Default Value" field will be displayed to be accepted or overridden.
  C Constant The element and its related value will not be displayed on the data entry screen. When the data are transmitted, this element will be sent with whatever information is indicated in the "Default Value" field. If the Requirement Code is "CF" or "CP", this element will be transmitted only if the paired element (the following element if "CF" and previous element if "CP") exists.
  F Formula. Use the formula in the field "Default Value". This element will not appear on the data entry screen.
HEADINGS Up to three lines of title for this element. This is how the element will be labeled on the data entry screen.
DASHES A Y or N switch to indicate whether to display a line of dashes between the title lines and the data for this element.

The user uses the manipulative capabilities until all of the element attributes have been defined as desired. It should be appreciated that the present invention enables the user to precisely define what information is going to be included in a particular transaction. Unlike prior art approaches which "hard code" a set format for one particular trading partner or a group of trading partners, the present invention permits a user to define a unique transaction format for one or more trading partners, store it, and then use the same equipment without further program modifications to define a totally different transaction format for a different trading partner. Once a transaction format has been defined in accordance with the process just described, the user exits back through to the screen in FIG. 10B.

In addition to setting these very specific parameters already mentioned, the user can set some overall transaction parameters for doing the mapping to the data entry screen. To this end, the screen of FIG. 10G is accessed by the user by entering Option "T" in the screen of FIG. 10B. The screen of FIG. 10G contains various fields where the user can enter information to build default attributes of the data entry screen. These attributes are outlined as follows:

COLUMN WIDTH This field can set up the data entry screen in columns. Each element placed on the screen will start in a position that is an even increment of the "Column Width". For example, if the "Column Width" is 10, then the elements on the data entry screen will start on positions: 10,20,30,40,50,... only. Most typically this is set to 1 to allow mapping in any area of the screen.

MINIMUM GAP BETWEEN FIELDS This sets the minimum number of spaces between each element on a data entry screen.

REVERSE VIDEO ON ENTRY (Y/N)
  Y=When an element is filled in on the data entry screen, it will have a white background and the characters will be black.
  N=Black background with white characters.

DEFAULT LINE SPACING Number of blank lines between an element the first heading of the next element down.

MANDATORY FIELD CHARACTER The character that will appear just before a keyed area on a data entry screen when both the segment and the element are mandatory. (This field may be left blank).

DASHES (Y/N) Dashes are dotted lines just under a heading. The dashes indicate the maximum size of the element.
  Y=The dashes will appear.
  N=The dashes will not appear. Dashes are not necessary for data entry if you are using reverse video which also shows field size.

CONTINUATION CHARACTER If a segment has a typical use of 2 or more and the entire segment will fit on one line of the screen, a table will be generated on the screen for the element in this segment. The Continuation Character will appear before the first element in each row of the table after the first row. The character that is to be displayed, to denote multiple table entries of the same data (without replacing the heading).

OVERLAY DESCRIPTION This is where identification of the trading partner and transaction are assigned to the overlay.

Exiting from screen 10G to screen 10B again, the next step is to select the "B" (build) option to have the system complete the first attempt at mapping of the dictionary-structured data to the (in this case) data entry screen. Exiting from this screen (10B) now brings up a manipulation screen like that shown in 10H.

FIG. 10H shows the actual, physical appearance of a data entry screen and the software allowed spatial adjustment of displayed fields and titles for the data field of each element designated to receive keyed input. If further tailoring of the display screen is desired, the user can use this screen (10H) to physically move the displayed fields to other areas of the screen thereby changing the mapping or can bring up any of the previously described screens to make additions, deletions, or title changes.

Figure 11:
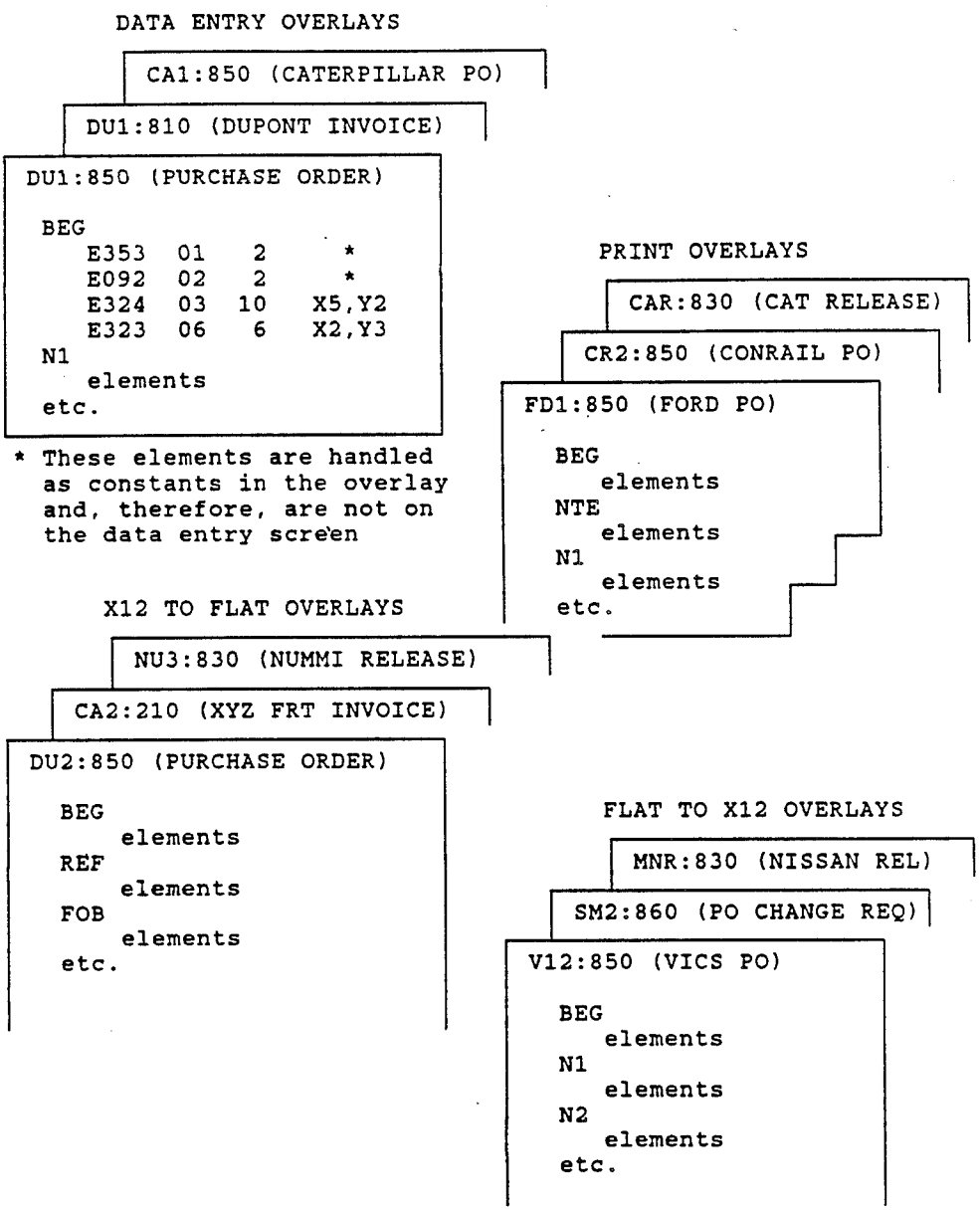
FIG. 11 is a pictorial representation of the types of overlays presently produced by this overlay generator.

After a field on the data entry screen is repositioned, the overlay generator module adjusts the formatting of the data entry screen and the mapping between the data entry fields and the elements in the dictionary-structured format. At this point in time the transaction format information is stored in a file on hard disk 16. This file contains a series of elements in the appropriate order for that transaction format. The file also contains identification information for each element, its position and its length. The file also contains a coordinate which is associated with the related field in the other system component or "other part" which will be described. A simplified representation of the overlay file is set forth in FIG. 11 where overlays for three different transactions are pictorially represented. The overlay for transaction format DU1:850 consists of ordered segments BEG, N1, etc. and their associated elements. The elements are in the specified order and each element has the following information: its dictionary-defined identification code, its position within the segment, its field length, and its mapping coordinates. For example, the third element in the segment BEG is code number 324 and the adjacent identifier (03) signifies that it is the third position in that segment. A typical number for its length would be 10. The mapping coordinate (X5, Y2) defines where the field for that element appears on the data entry screen. The definition of the location for each field is discussed in connection with "building" the screen. The overlay generator module operates in a similar manner to generate the other overlays pictorially represented in FIG. 11.

Figure 3A:
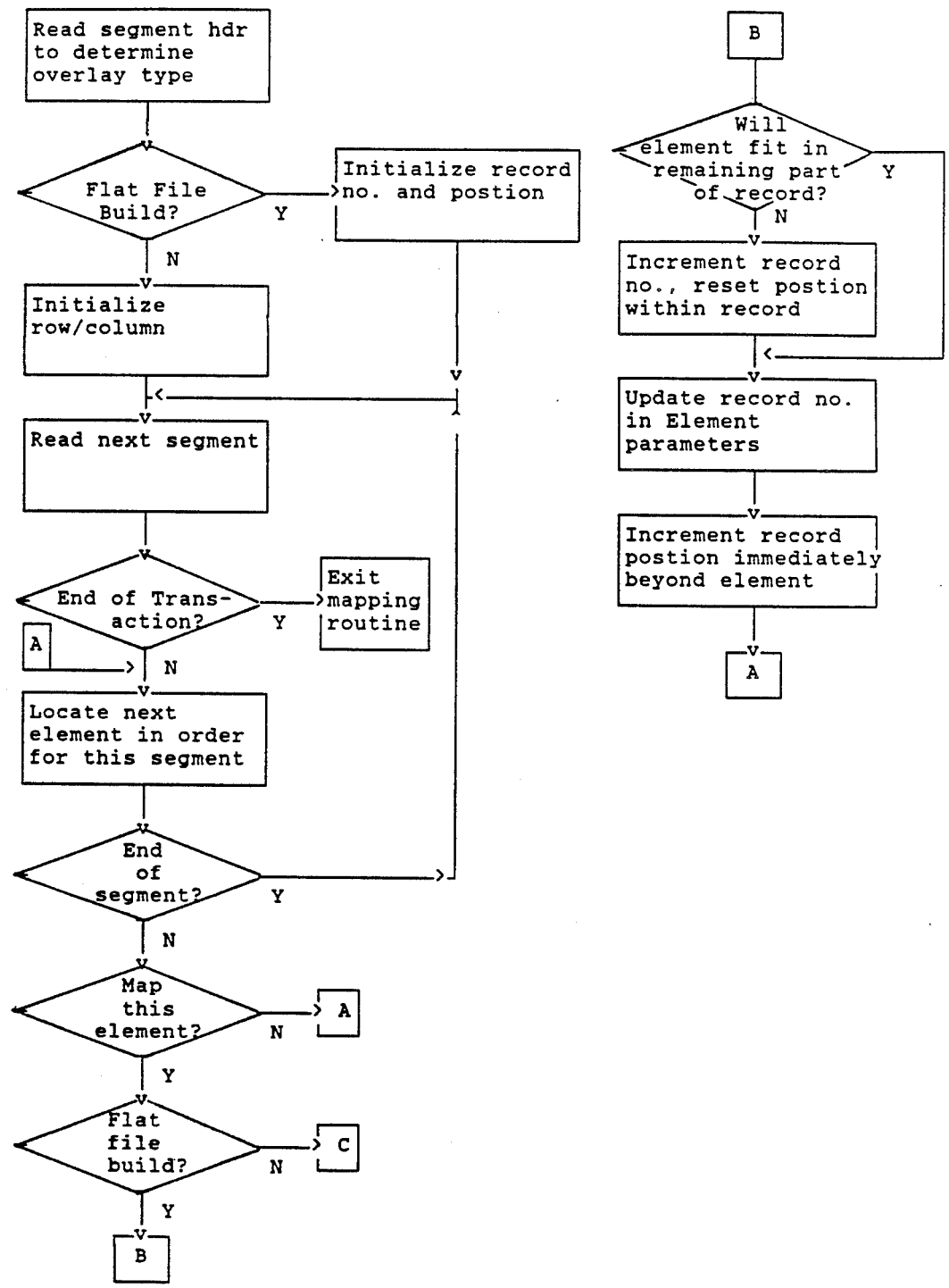
FIG. 3 (A-B) is a flowchart of how the system builds a particular overlay and mapping therefor.
Figure 3B:
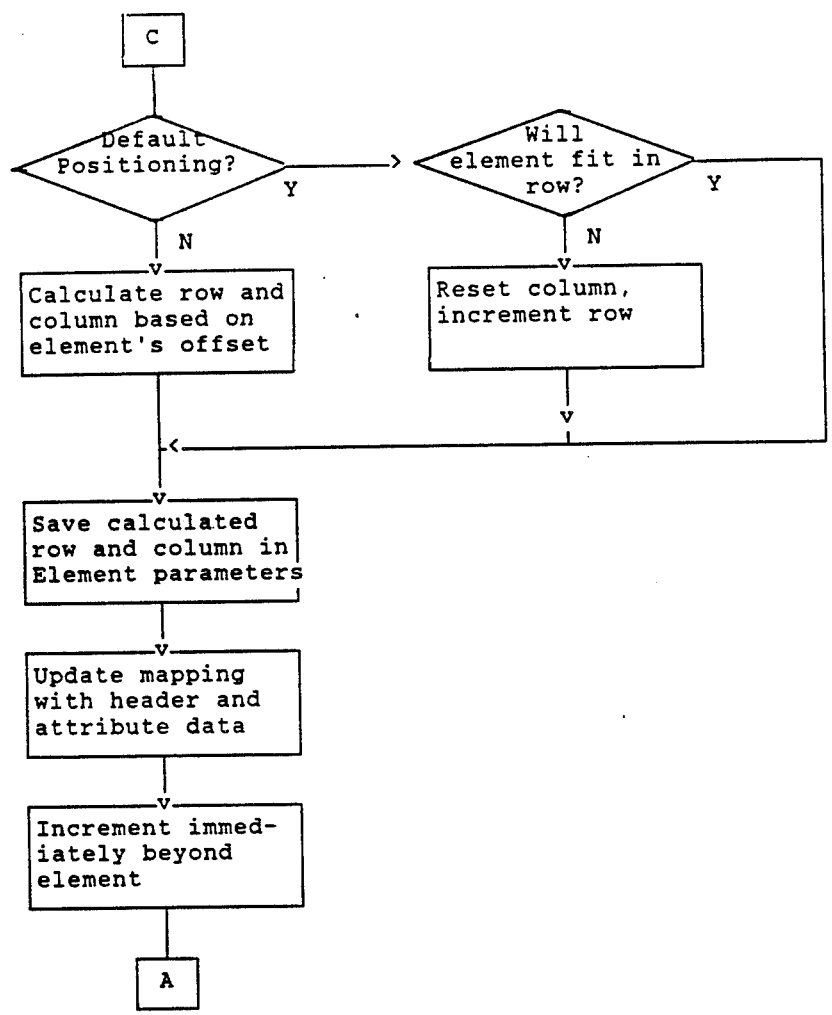

Assume that during the screen building process, the user located the fields in the character positions shown in FIG. 12 which represents a simplified data entry screen. The overlay generator, during the mapping process, would locate the character position of the first element in the transaction format file and insert those mapping coordinates (X5, Y2) in the appropriate field in the data entry overlay The other elements likewise contain their respective mapping coordinates. If the user decides to rebuild a new screen, the elements in the transaction format file remain in their same order but the mapping coordinates will change to correspond to their new location on the screen. The overlays for the other system components (e.g., printer) are arranged in similar fashion but contain mapping coordinates which are associated with that particular device. The flow chart of FIG. 3 describes in more detail how the machine system builds the data entry overlay.

FIG. 4 describes in detail how this overlay can now be used to enter and translate data for transmission to a trading partner. Briefly, data (e.g., price) associated with a given element (e.g., E212) are entered into the related fields on screen 22 by the user via keyboard 20. The entered data and the element mapping coordinate are stored in an intermediate file. The data are each associated with a mapping coordinate for each associated element. Before it is time to actually transmit the data, a software module instructs the CPU 14 to read each element from the pertinent overlay, along with its associated mapping coordinate (see FIG. 13). Software uses this mapping coordinate as a pointer to the intermediate file where is fetches the data having a corresponding mapping coordinate. Thus, data D2 would be placed in the sixth position since it is associated with the sixth element E323 of the dictionary-structured format (see FIG. 11). This reordering sequence continues until the data are all arranged in the appropriate sequence. Then, they can be transmitted to the trading partners in dictionary-structured format.

In view of the foregoing, it should be appreciated that the present invention provides the user with a tremendous amount of flexibility without requiring a change in the software. Thus, it is not necessary to rewrite the software every time a new trading partner dictates a different dictionary-structured transaction format. Various other advantages of the present invention will become apparent to those skilled in the art after having the benefit of a study of the specification, drawings, microfiche appendix and following claims.

I claim:

1. A programmable machine system for operating on business transaction data in a plurality of different dictionary-structured transaction formats, said machine system including a plurality of system components, said machine system comprising:
    first means for defining an overlay for each of the different dictionary-structured formats, each such overlay having an ordered sequence of elements and mapping coordinates of given elements to related fields of a given system component; and
    second means, using a selected overlay, for translating data in one of the dictionary-structured formats into a different format for use on the given system component;
    whereby the same programmable machine system is operated on different dictionary-structured transaction formats without software modification.

2. The system of claim 1 in which one of the system components is a memory, and wherein said memory contains information associated with segments and elements of a given transaction, and wherein said first means comprises:
    means for displaying to the user those segments that are mandatory for a given transaction;
    means, accessible to the user, for modifying the number, order and attributes of the segments and elements for a given transaction;
    means for selecting a given system component having a plurality of fields, some of which are associated with certain elements;
    means for tailoring the given system component by moving the fields to different locations within the system component; and
    means for automatically updating the mapping coordinates of the elements associated with the moved fields.

3. The system of claim 2 wherein said given system component is a data entry screen and wherein said machine system further comprises:
    a keyboard for entering data; and
    means for placing data entered onto the screen through the keyboard into an appropriate ordered position for its associated element in the dictionary-structured transaction format.

4. The system of claim 3 which further comprises means for transmitting translated data in a dictionary-structured transaction format to a trading partner.

5. A programmable machine system having a plurality of system components for defining, entering, and translating business transaction data for transmitting said data among trading partners, said system comprising:
    (a) input means for defining a dictionary-structured transaction format having a plurality of elements in a particular organization;
    (b) selector means for selecting a given system component;
    (c) overlay generator means cooperating with the input means and selector means for generating an overlay associated with the selected system component, said overlay being used to define at least one second format having positionable parts in the selected system component that are related to the elements in the dictionary-structured transaction format, the overlay also containing a mapping between the location of such parts in the selected system component to its associated elements in the dictionary-structured format;
    (d) translating means for translating data entered in the second format into said dictionary-structured format; and
    (e) transmitting means for transmitting the translated data in the dictionary-structured transaction format to a trading partner.

6. The system of claim 5 which further comprises:
memory means containing:
    (a) an element dictionary including an identification code for a datum defining each element and certain parameters therefor;
    (b) a segment dictionary including an identification code for each segment defined by a group of elements in a particular order; and
    (c) a transaction dictionary including an identification code for each transaction defined by a plurality of segments in a particular order; and
    wherein the system further comprises:
        means for selecting information from said dictionaries to create a plurality of different dictionary-structured transaction formats, with the overlay generator means being used to create second formats for the selected system component and a mapping to each transaction format that is created.

7. The system of claim 6 wherein:
at least one of the system components includes a keyboard;
the selected system component is a display screen.
the system uses a selected overlay to position certain characters on the display screen that are associated with a given element together with data entry fields therefor;
the keyboard is used to enter data into the data entry field on the display screen; and
the system translates entered data into the dictionary-structured format.

8. The system of claim 6 wherein:
the selected component is a printer used to print data in a user-friendly format, and
said overlay is used by the translating means to translate data to be printed via the printer from the dictionary-structured format into the user-friendly format.

9. The system of claim 6 wherein:
said memory means includes a disk memory, and said overlay is used by the translating means to translate data in a dictionary-structured format into a fixed-field format for storage on the disk memory.

10. The system of claim 6 wherein:
said selected system component is a disk memory, and said overlay is used by said translating means to translate data stored on the disk memory in a fixed-field format into a dictionary-structured format.

11. A method of using a programmable machine to perform electronic data interchange among trading partners, with at least two of the trading partners employing different dictionary-defined transaction formats, said programmable machine having a plurality of system components including a keyboard, a display screen, and a memory, said method comprising:
(a) entering a transaction code into the keyboard for a given trading partner;
(b) displaying segments for the entered transaction code on the screen;
(c) creating a data entry overlay that includes information stored in the memory which contains an ordered sequence of elements in a dictionary-structured format and mapping coordinates to positions on the screen where associated data fields relating to each element are located;
(d) moving the data entry fields on the screen to generate a desired screen format, with the mapping coordinates to the associated elements in the overlay being updated accordingly;
(e) entering data into the data entry fields;
(f) using the data entry overlay to translate the entered data into the appropriate order for the defined dictionary-structured transaction format; and
(g) transmitting data in the dictionary-structured transaction format to a trading partner.

12. The method of claim 11 which further comprises:
(h) storing an element dictionary in the memory, said element dictionary including an identification code for a datum defining each element and certain parameters therefor;
(i) storing a segment dictionary in the memory, said segment dictionary including an identification code for each segment defined by a group of elements in a particular order; and
(j) storing a transaction dictionary in the memory, said transaction dictionary including an identification code for each transaction defined by a plurality of segments in a particular order; and
wherein step (b) includes automatically displaying mandatory segments for each transaction code on the screen.

13. The method of claim 12 which further comprises:
(k) modifying the displayed segments to thereby specifically tailor the transaction format as desired.

14. The method of claim 13 which further comprises:
(l) performing steps (a) through (e) for a plurality of different trading partners, whereby the machine is used to define, enter and translate business transaction data for transmission among a variety of trading partners even though each such trading partner uses different dictionary-structured transaction formats.

15. A programmable machine system for operating on business transaction data in first and second dictionary-structured transaction (DST) formats, the machine system having a plurality of system components, the machine system comprising:
first means for defining a first overlay for the first DST format, and a second overlay for the second DST format, with each such overlay having an ordered sequence of elements and mapping coordinates of given elements to related fields of a selected one of the system components; and
second means, using the first overlay, for translating data in the first DST format into a different format for use with the selected one of the system components, and using the second overlay, for translating data in the second DST format into the different format for use with the selected one of the system components;
whereby the same programmable machine system and the selected system components is operated on data in different DST formats without reprogramming applications software to accommodate such different DST formats.

16. The machined system of claim 15 in which the system components includes at lest a data entry screen device and a mass memory device, and wherein:
the first means defines different overlays for use with the data entry screen device and the mass memory device.

17. The machine system of claim 15, wherein two of the selected system components are a data entry screen and a keyboard for entering data, and the machine system further comprises:
means, for placing data entered onto the screen through the keyboard into the appropriate ordered position for its associated element in a DST format.

18. The system of claim 15 in which the system components include a memory device and wherein the memory device contains information associated with segments and elements of a given transaction, and wherein the first means comprises:
means for displaying to a user those segments that are mandatory for a given transaction; and
means, accessible to the user, for modifying the number, order and attributes of the segments and elements for a given transaction.

19. The system of claim 15, in which a plurality of the system components each have a plurality of different locations for data therein, and the system further comprises:
means for selecting a given system component having a plurality of fields at various different locations, some of which are associated with certain elements;
means for tailoring a given system component by moving selected one of such fields to different locations within the system component; and
means for automatically updating mapping coordinates of the elements associated with the moved fields.

20. A programmable machine system having a plurality of components for defining, entering, and translating business transaction data to be transmitted among trading partners, the system comprising:
input means for defining a dictionary-structured transaction (DST) format having a plurality of elements arranged in a particular organization;
means for selecting a given system components;
means, cooperating with the input means and means for selecting, for generating overlay means associated with the selected system component, the overlay means being for defining a second format having positionable parts associated within locations in the selected system component that are related to the elements in the DST format, the overlay means also containing mapping means for correlating the locations of such parts in the selected system component to associated elements in the DST format; and means for translating data entered in the second format into the DST format.

21. The system of claim 20, which further comprises: means for transmitting data translated into the DST format to a trading partner.

22. The system of claim 20 which further comprises: programmed memory means containing
 (a) an element dictionary including an identification code for each datum defining an element;
 (b) a segment dictionary including an identification code for each segment defined by a group of elements in a particular order; and
 (c) a transaction dictionary including an identification code for each transaction defined by a plurality of segments in a particular order.

23. The system of claim 22, which further comprises: means for selecting information from the dictionaries in order to create different DST formats.

24. A method of using a programmable machine including a mass memory, keyboard, data entry screen and central processing unit (CPU) to enter electronic business data in first and second different dictionary-structured transaction (DST) formats into a machine in preparation for interchange of such data among trading partners, said method comprising the steps of:
 (a) loading, from mass memory into the CPU, a first DST overlay associated with the first DST format;
 (b) entering data via the keyboard associated with given elements of the first DST format into related fields shown on the screen;
 (c) under the control of the CPU and using the first DST overlay, storing data entered during step (b) in an intermediate file;
 (d) loading, from mass memory into the CPU, a second DST overlay associated with the second DST format;
 (e) entering data via the keyboard associated with given elements of the second DST format into related fields shown on the screen; and
 (f) under the control of the CPU and using the second DST overlay, storing data entered during (e) in an intermediate file.

25. The method of claim 24, further comprising the step of:
 (g) under the control of the CPU and using at least one DST overlay, fetching data entered during steps (b) and (e) from one or more intermediate files in preparation for transmission of such data to a trading partner.

26. The method of claim 24, further comprising the step of:
 (g) creating the first and second DST overlays, with each such overlay containing information about the ordered sequence of elements in its DST format and mapping coordinates to positions on the screen where associated data fields relating to each element are located.

27. The method of claim 26, further comprising the step of:
 (h) moving the data entry fields associated with the first DST overlay on the screen to generate a desired screen format, and
 (i) updating mapping coordinates of the associated elements in the first DST overlay accordingly.

28. In a programmable machine system, including a keyboard, a display screen, a processor and at least one mass memory device, for operating on business transaction data in different dictionary-structured transaction (DST) formats, a method of translating data organized in first and second DST formats to a file format composed of fixed-field, fixed-length records, comprising the steps of:
 (a) interactively using the keyboard, display screen and processor to define, without manually coding a computer program, a first DST overlay including mapping coordinates;
 (b) formatting at least one segment of data in the first DST format into the fixed file format by moving elements of the data about in accordance with mapping coordinates contained in the first DST overlay;
 (c) storing the data formatted in step (B) in a fixed file in a mass memory device;
 (d) interactively using the keyboard, display screen an processor to define, without manually coding a computer program, a second DST overlay including mapping coordinates;
 (e) formatting at least one segment of data in the second DST format into the fixed file format by moving elements of the data about in accordance with mapping coordinates contained in the second DST overlay; and
 (f) storing the data formatted in step (e) in a fixed file in a mass memory device.

29. The method of claim 28, further comprising the steps of:
 storing the first and second DST overlays in a mass memory device for later use;
 loading the first DST overlay from the mass memory device into the processor when needed for use; and
 loading the second DST overlay into the processor from the mass memory into the processor when needed fur use.

30. The method of claim 28, wherein in the formatting steps (b) and (e) each include the substeps of:
 (1) finding a position where current element data corresponding to a specific element in the DST format are to be placed;
 (2) determining whether such current element data would overlay a value already loaded into a flat image work file;
 (3) writing the flat image work file if in substep (2) it is determined that the current element data would overlay a value already loaded into the flat image work file.

31. In a programmable machine system, including a manual input means, a display screen, processor and a mass memory device, for operating on business transaction data in different dictionary-structured transaction (DST) formats, a method of translating data organized in a fixed file format composed of fixed-field, fixed-length records into a first and second (DST) formats, the method comprising the steps of:
 (a) interactively using the manual input means, display screen and processor to define, without manually coding a computer program, a first DST overlay including mapping coordinates:
 (b) formatting at least one segment of data in the fixed file format into the first DST format by moving elements of the data about in accordance with mapping coordinates contained in the first DST overlay;

(c) storing the data formatted in step (B) in a DST file in a mass memory device;

(d) interactively using the manual input means, display screen and processor to define, without manually coding a computer program, a second DST overlay including mapping coordinates;

(e) formatting at least one segment of data in the fixed file format into the second DST format by moving elements of the data about in accordance with mapping coordinates contained in the second DST overlay; and (f) storing the data formatted in step (e) in a DST file in a mass memory device.

32. The method of claim 31, further comprising the steps of:

storing the first and second overlays in a mass memory device for later use;

loading the first DST overlay from the mass memory device into the processor when needed for use; and loading the second DST overlay into the processor from the mass memory into the processor when needed for use.

33. The method of claim 32, wherein the formatting steps (b) and (e) each include the substeps of:

using a flat file image work file to temporarily store data; and periodically writing data from the image work file to a mass memory device.

34. The method of claim 31, wherein the storing steps (c) and (f) each include the substep of writing transaction, group and interchange trailers to the fixed file at the end of at least the last segment of formatted data being stored in the DST file.

35. The method of claim 31, wherein the formatting steps each include the substeps of:

locating current segments and elements in the DST overlay being used in the formatting step;

determining whether a current element is a constant or a formula;

if the current element is a constant moving the constant value to a corresponding flat element; and if the current element is a formula moving a calculated formula value to a corresponding flat element.

36. In a programmable machine system for operating on business transaction data in different dictionary-structured transaction (DST) formats, said machine system including a plurality of system components including manual input means, a display screen, processor, and memory; a method of creating a data entry overlay to help minimize manual input of data comprising the steps of:

interactively using the manual input means, display screen, processor and memory to define, without manually coding a computer program, a basic data entry DST overlay having an ordered sequence of elements and mapping coordinates of given elements to related fields of the display screen by specifying an overlay code and a transaction type code; and customizing the basic data entry overlay thus defined by modifying at least one of the characteristics provided in the basic data entry overlay.

37. The method of claim 36, wherein the customizing step includes modifying at least one of the elements provided in the data entry overlay.

38. The method of claim 36, wherein the customizing step includes specifying overall transaction parameters for mapping data entered via the manual input means to the display screen.

39. The method of claim 38, wherein the overall transaction parameters being specified include at least two parameters elected from the group of screen parameters consisting of column width, minimum gap between elements on the display screen, reverse video selection, default line spacing, and mandatory field characters adjacent selected fields.

40. The method of claim 38, wherein the overall transaction parameters being specified include visual effects on the screen to indicate maximum allowable sizes of corresponding elements, and overlay description fields where identification of a trading partner and transaction are placed on the screen.

41. The method of claim 36, wherein the customizing step includes tailoring the appearance of the screen by moving at least two fields to different locations on the display screen.

42. The method of claim 36, in which the DST overlay includes a plurality of segments with each segment having one or more functionally related elements in a defined sequence, and wherein the customizing step includes modifying at least one of the segments.

43. The method of claim 42, wherein the customizing step includes the substeps of:

(a) selecting desired segments out of those segments displayed on the display screen;

(b) specifying a maximum number of times a specific selected segment is permitted to appear specific location on the screen; and (c) specifying whether particular groups of logically related segments will occur repetitively.

44. The method of claim 42, in which each segment has a name, and wherein the customizing step includes the substeps of:

(a) changing a segment name; and (b) specifying beginning and ending segments of a group of logically related segments that occur repetitively.

45. The method of claim 43, wherein the customizing step includes the substeps of:

(a) adding elements within a first segment of the basic data entry DST overlay; and (b) deleting elements within a second segment of the basic data entry DST overlay;

46. The method of claim 43, wherein the customizing step includes specifying attributes of elements within at least one segment of the basic data entry DST overlay.

47. The method of claim 46, wherein specifying attributes of elements within segments is accomplished at least in part by using the manual input means to enter particular selections of attributes for selected elements displayed upon the display screen.

48. The method of claim 46, wherein the attributes specified include at least two attributes selected from the group of attributes consisting of element codes, data types, requirement codes, number of characters, and default codes.

* * * * *